Sept. 4, 1951 H. M. ZEIDLER 2,566,508

AMPLIFIER NETWORK

Filed Dec. 2, 1947

INVENTOR.
Howard M. Zeidler
BY Flehr & Swain
ATTORNEYS

Patented Sept. 4, 1951

2,566,508

UNITED STATES PATENT OFFICE 2,566,508

AMPLIFIER NETWORK

Howard M. Zeidler, Palo Alto, Calif., assignor to Hewlett-Packard Company, Palo Alto, Calif., a corporation of California Application December 2, 1947, Serial No. 789,282

3 Claims. (Cl. 179—171)

This invention relates generally to electronic amplifier networks, and particularly to amplifiers applicable to video and audio frequencies.

Electronic amplifiers of the resistance coupled type are commonly used where it it necessary to operate over a wide range of frequencies. It is well known however that conventional resistance-coupled electronic amplifiers have circuit components tending to cause phase shift and loss of amplification gain, the effects of which are particularly noticeable at the lower frequencies. Loss of amplification at low frequencies is attributed largely to screen and/or cathode degeneration, which in turn results from inadequate screen and/or cathode by-passing.

In the past it has been proposed to use supplemental compensating circuits containing resistance and capacitance elements for the purpose of correcting the phase shift to within permissible limits. However such conventional correcting methods have not been entirely satisfactory in that they have not afforded correction to the extent desired, and they have required resistance and capacitance elements of such size as to add materially to the cost of the network.

It is an object of the present invention to provide an electronic amplifier network making possible relatively constant amplification gain over a wide range of frequencies, and suitable for example for video and audio frequencies.

A further object of the invention is to provide an electronic amplifier network which minimizes the requirement for screen and cathode by-passing where vacuum tubes of the tetrode or pentode type are employed.

Another object of the invention is to provide an amplifier network which will facilitate use of relatively large amounts of negative feedback, without encountering difficulty due to parasitic low frequency phase shifts.

Additional objects of the invention will appear from the following description in which the preferred embodiment has been set forth in detail in conjunction with the accompanying drawing.

Referring to the drawing.

The present invention consists of an amplifier network in which loss of gain at relatively low frequencies, due particularly to screen and/or cathode degeneration resulting from inadequate by-passing, is compensated for by an increase in the plate circuit gain of the tube. The means by which this is accomplished is relatively simple and can be applied individually to the separate stages of a multi-stage amplifier network.

Figure 1:
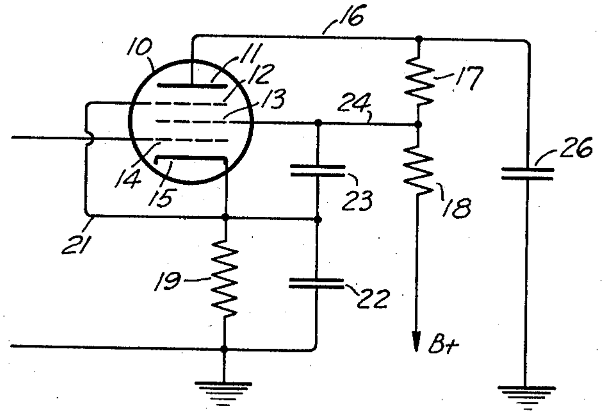
Figure 1 is a circuit diagram showing one embodiment of the invention.

The single amplifier stage illustrated in Figure 1 comprises a vacuum tube pentode 10 consisting of plate 11, suppressor grid 12, screen grid 13, control grid 14, and cathode 15. Input voltages are applied to the control grid 14 as illustrated. The plate circuit includes a conductor 16, the two resistors 17 and 18, and a source of B battery or plate voltage as illustrated. The negative side of the plate voltage source is presumed to be grounded. Biasing resistor 19 connects cathode 15 with ground. Conductor 21 directly connects the suppressor screen 12 with the cathode 15. A by-pass condenser 22 is shunted across resistor 19. Another condenser 23 is connected between the screen 13 and the cathode, and the screen is connected by conductor 24 to a point between the resistors 17 and 18. One side of the input is shown connected to the control grid 14 and the other side to ground.

Normally the plate circuit of the network is coupled to a succeeding load, which in a typical instance may be the input of a second amplifier stage. In this connection it is customary to use a conventional blocking condenser connected between conductor 16 and the input of the succeeding stage. Condenser 26, which is shown connected between conductor 16 and ground, is representative of the sum of the output capacitance of the stage, plus the input capacitance of the succeeding stage.

In order to secure the desired advantages of the circuit described above, I have discovered that certain resistance and capacitance elements must be proportioned in accordance with a definite mathematical relation. To facilitate an explanation of the mathematical relationship, Figure 2 indicates certain symbols applied to the resistance and capacitance elements incorporated in Figure 1.

For very low frequencies where $C_2$ and $C_k$ have essentially infinite impedance, the gain of the above circuit can be expressed mathematically as follows:

(Equation 1)

$$\frac{-G_mR_1\left(1+\frac{R_2}{R_1}\cdot\frac{G_m+G_{sg}}{G_m}\right)}{1+R_k(G_m+G_{sg})\left(1+\frac{1}{\mu_{sg}}\right)+\frac{R_2}{\mu_{sg}}(G_m+G_{sg})}$$

where $G_m$=Mutual conductance of the control grid with respect to the plate current.

Figure 2:
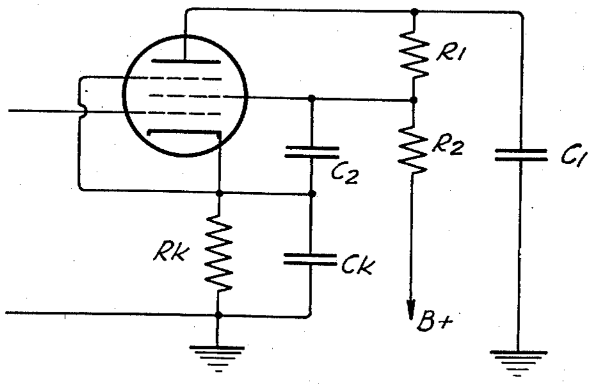
Figure 2 is a diagram like Figure 1 but with symbols applied as used in formulas contained in this specification.

$R_1$, $R_2$, and $R_k$=Values of resistors identified in Figure 2.

$G_{sg}$=Mutual conductance of the control grid with respect to the screen grid current.

$\mu_{sg}$=Amplification factor of the screen grid with respect to the control grid.

In the above formula (Equation 1) it is assumed that (Equation 2)

$$G_m=\left[\frac{\partial i_p}{\partial e_g}\right]e_p,\ e_{sg}\text{—Constant}$$

(Equation 3)

$$G_{sg}=\left[\frac{\partial i_{sg}}{\partial e_g}\right]e_p,\ e_{sg}\text{—Constant}$$

and (Equation 4)

$$\mu_{sg}=\left[\frac{\partial e_{sg}}{\partial e_g}\right]i_p,\ i_{sg}\text{—Constant}$$

where $\partial i_p$=Incremental plate current $\partial e_g$=Incremental control grid voltage $\partial i_{sg}$=Incremental screen grid current $\partial e_{sg}$=Incremental screen grid voltage $e_p$=Instantaneous value of varying components of plate voltage $e_{sg}$=Instantaneous value of varying components of screen grid voltage The derivation of Equation 1 can be explained as follows: At high frequencies (neglecting the effect of condensers $C_1$ and $C_k$) condenser $C_2$ is effectively a short circuit between screen grid and cathode for signal currents. Hence no degenerative current flows in $R_2$ or $R_k$ and the gain is that of a conventional pentode. This can be expressed as follows:

(Equation 5)

$$\text{Gain (High freq.)}=-G_mR_1$$

At low frequencies, condenser $C_2$ is effectively an open circuit and two effects occur simultaneously: First, the degenerative effect of the unbypassed cathode, resistor $R_k$, and the unbypassed screen resistor, $R_2$, introduces degeneration. Secondly, the effective load impedance of the tube has now been increased from $R_1$ to $(R_1+R_2)$. The effect of degeneration on the cathode current, $i_b$, may be readily seen to be (Equation 6)

$$i_b=(G_m+G_{sg})\left[(e_i-i_bR_k)+\frac{-i_b(R_2+R_k)}{\mu_{sg}}\right]$$

where $e_i$ is the input signal voltage. Solving this equation for $i_b$ (Equation 7)

$$i_b=\frac{e_i(G_m+G_{sg})}{1+R_k(G_m+G_{sg})\left(1+\frac{1}{\mu_{sg}}\right)+\frac{R_2}{\mu_{sg}}(G_m+G_{sg})}$$

$i_b$ is now known in terms of input signal and with the knowledge of the partition of this current between the plate and the screen grid, the overall low frequency voltage gain may be readily calculated to be according to the above Equation 1.

If the high frequency and low frequency gain expressions are equated it is found that (Equation 8)

$$R_2=R_k\frac{G_mR_1(\mu_{sg}+1)}{\mu_{sg}-G_mR_1}$$

I have discovered that except for the effect of the condensers $C_1$ and $C_k$, the gain of the above network will remain the same at all frequencies whether condenser $C_2$ is used or not, provided certain components of the network are proportioned according to a formula as follows:

(Equation 9)

$$R_2=R_k\frac{G_mR_1(\mu_{sg}+1)}{\mu_{sg}-G_mR_1}$$

The above Equation 9 can be derived by equating the above expressions for high (Equation 5) and low frequency (Equation 1) gain.

At relatively high frequencies a substantial portion of the plate current returns to the cathode through condenser $C_1$ and any cathode-to-ground impedance. Excessive cathode degeneration is prevented by shunting $R_k$ with the small condenser $C_k$, which by-passes the high frequency currents from $C_1$ to the cathode.

Condenser $C_2$ (23) should be sufficiently large to effectively by-pass the plate and screen grid to cathode at a frequency substantially lower than that at which the input admittance of the stage would otherwise produce serious loading on the preceding stage. This requirement can be explained by the fact that when the condenser $C_2$ is removed, the input admittance to the stage is considerably larger than when the condenser $C_2$ is applied, due to the "Miller effect" between the control and screen grids.

As an example of actual practice I have used a vacuum tube of the type known by manufacturers' specifications as No. 6AK5, with the various components of the network as follows:

$G_m$=4,000 micromhos
$R_1$=5,000 ohms
$\mu_{sg}$=31
$R_k$=150 ohms
$R_2$=8,750 ohms
$C_2$=1,000 mmf.
$C_k$=1,000 mmf.

The stage gain for the above network was 26 db. With a value of 10 mmf. for capacitance $C_1$, the response to the amplifier was substantially flat up to frequencies of the order of 2 megacycles at which point the response was about 70% of the response at midband. For the frequencies below midband there was no loss in gain except that due to the plate coupling condenser to the succeeding stage.

Comparable conventional circuit arrangements using a cathode by-pass condenser of 50 mfd., and a screen by-pass condenser of 1 mfd., would provide at 20 cycles a phase shift of the order of 35° and a gain equal to 60% of midband gain.

I claim:

1. In an electronic amplifier network for amplifying a wide range of frequencies including relatively low audio frequencies, the network incorporating a vacuum tube having plate, screen grid, control grid and cathode elements, a plate circuit including a source of plate voltage and two serially connected resistors ($R_1$ and $R_2$) serving to connect the positive side of the plate voltage source to the plate, a conductive connection from the screen grid to a point between said resistors whereby one of said resistors ($R_1$) is connected between the screen grid and the plate, a biasing resistor ($R_k$) connected from the negative side of the plate voltage source to the cathode, a condenser ($C_2$) connected between the screen grid and the cathode, another condenser ($C_k$) shunted across the biasing resistor, and an input circuit having one side of the same connected to the control grid and the other side of the same connected to the negative end of the plate voltage source, said resistors being proportioned substantially in accordance with the mathematical relationship $$R_2 = R_k \frac{G_m R_1 (\mu_{sg}+1)}{\mu_{sg} - G_m R_1}$$

where $R_1$, $R_2$ and $R_k$ are the values of resistors identified above, $G_m$ is the mutual conductance of the control grid with respect to the plate current, and $\mu_{sg}$ is the amplification factor of the screen grid with respect to the control grid.

2. In an electronic amplifier network for amplifying a wide range of frequencies including relatively low audio frequencies, said network incorporating a vacuum tube having plate, screen grid, control grid and cathode elements; of a plate circuit for the vacuum tube including a source of plate voltage and two serially connected resistors serving to connect the positive side of the plate voltage source to the plate, a conductive connection from the screen grid to a point between said resistors, a biasing resistor having one terminal of the same connected to the cathode and its other terminal connected to the negative side of the plate voltage source, a condenser connected between the screen grid and the cathode, another condenser connected across said biasing resistor, said last named condensers each being of such small value as to present substantial impedance for the lower frequencies of said range and effective bypass only for the higher frequencies of said range, and an input circuit having one side of the same connected to said control grid and the other side of the same connected to the negative side of the plate voltage source, the value of said resistors being so proportioned that the gain of the network is independent of the condenser which is connected between the screen grid and the cathode, whereby the cathode and screen bypass circuits introduce no phase shift or change in gain at any frequency within said range down to zero frequency.

3. In an electronic network for amplifying a wide range of frequencies, including relatively low audio frequencies, the network incorporating a vacuum tube having plate, screen grid, control grid and cathode elements; of a plate circuit including a source of plate voltage and two serially connected resistors serving to connect the positive side of the plate voltage source to the plate, a direct conductive connection of negligible impedance from the screen grid to a point between said resistors, a biasing resistor connected from the negative side of the plate voltage source to the cathode, a condenser connected between the cathode and the screen grid, and another condenser connected across said biasing resistor, said last named condensers each being of such small values as to present substantial impedance for the lower frequencies of said range and effective bypassing only for the higher frequencies.

HOWARD M. ZEIDLER.

REFERENCES CITED

The following references are of record in the file of this patent:

UNITED STATES PATENTS

| Number | Name | Date |
|---|---|---|
| 2,218,925 | Roberts | Oct. 22, 1940 |
| 2,284,555 | Black | May 26, 1942 |
| 2,365,575 | Maxwell | Dec. 19, 1944 |
| 2,392,415 | Soller | Jan. 8, 1946 |